United States Patent
Barnes et al.

[11] 3,779,345
[45] Dec. 18, 1973

[54] EMERGENCY LUBRICATION SUPPLY SYSTEM

[75] Inventors: Thomas Carl Barnes, Boxford; Malcolm Hubert Knapp, South Lynnfield, both of Mass.

[73] Assignee: General Electric Corporation, Lynn, Mass.

[22] Filed: May 22, 1972

[21] Appl. No.: 255,718

[52] U.S. Cl................ 184/6.4, 60/39.08, 184/6.11
[51] Int. Cl.......................... F01m 1/20, F16n 29/02
[58] Field of Search.................. 184/6.4, 6.11, 6.26, 184/55 A; 60/39.08

[56] References Cited
UNITED STATES PATENTS

| | | | |
|---|---|---|---|
| 3,106,262 | 10/1961 | Rogerson | 184/6.4 |
| 3,447,562 | 6/1969 | Hoffman | 137/414 |
| 3,527,323 | /1970 | Malec | 184/55 A |
| 2,604,188 | 9/1952 | Marchant | 184/6.11 |
| 3,057,433 | 10/1962 | Rusche | 184/55 A |
| 2,966,312 | 12/1960 | Wilson et al. | 184/55 A |
| 2,664,173 | 12/1953 | Karig | 184/6.26 |
| 3,563,344 | 2/1971 | Veller | 184/6.4 |

FOREIGN PATENTS OR APPLICATIONS

| | | | |
|---|---|---|---|
| 658,044 | 10/1951 | Great Britain | 184/6.11 |

*Primary Examiner*—Manuel A. Antonakas
*Assistant Examiner*—Allan R. Burke
*Attorney*—Edward S. Roman et al.

[57] ABSTRACT

An emergency lubrication supply system operates to continuously provide oil to a lubricated part during normal operation of the part and for a limited duration after failure of a main supply of lubrication to the part. Means for providing a flow of pressurized air are further included in order to draw a sufficient stream of lubricant from an emergency reservoir to adequately lubricate the bearing for the limited duration after failure of the main system. The flow of pressurized air further acts to provide a cooling effect on the lubricated part.

12 Claims, 3 Drawing Figures

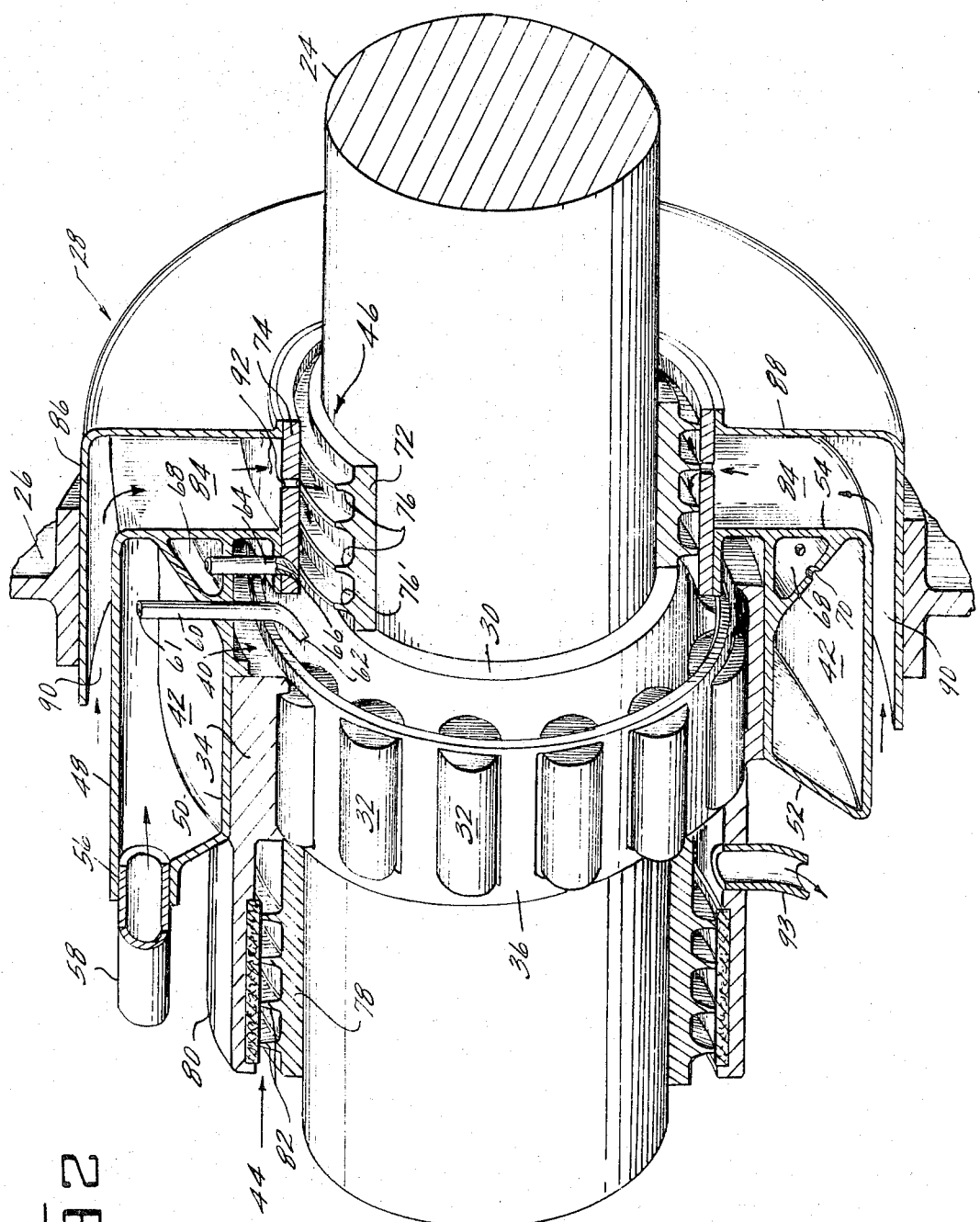

EMERGENCY LUBRICATION SUPPLY SYSTEM

The invention herein described was made in the course of, or under a contract or subcontract thereunder (or grant), with the Department of the Army.

BACKGROUND OF THE INVENTION

This invention relates generally to an emergency lubrication supply system and, more particularly, to an emergency lubrication supply system for providing lubricant to a lubricated part for a limited duration after failure of a main lubrication supply system.

In gas turbine engines, high speed rotational shafts are journalled within bearings for rotation with respect to stationary engine frame members. The bearings must be supplied with a continuous stream of lubricant which is generally provided from a main reservoir located a substantial distance from the bearings. Oil from the main reservoir is pressurized by means of a pump whereupon the pressurized oil is directed to the individual bearings through a series of coolers, filters, and pipes. The bearings are generally housed within sumps in order to contain the oil in the area of each bearing whereupon oil collecting at the bottom of each sump is returned to the main reservoir by appropriate scavenging means. Other engine parts such as gears and splines must also be appropriately lubricated in order to avoid a premature failure of the part.

The oil reservoir, pumps, oil coolers, filter and piping of the main oil supply system are generally located external to the engine casing. Therefore, the possibility of a rupture or puncture of the main oil supply system components is of particular concern to military aircraft flying combat missions where the exposed components are more vulnerable to enemy fire than the internal engine components.

In the event of a rupture or puncture in the oil supply system, oil pressure and flow to the individual lubricated parts will rapidly decrease. Without lubrication the high speed rotor interconnecting the compressor and turbine will rapidly seize within its bearings resulting in catastrophic engine failure.

The inclusion of emergency oil reservoirs has been suggested in order to provide a limited period during which an emergency stream of lubricant can be provided to the lubricated parts after loss of lubricant from the main oil supply system. The aircraft may therefore continue to safely operate for a limited time, generally sufficient to find a safe landing zone, after sustaining damage to the lubrication system. Such a requirement is of critical importance particularly for a military aircraft operating under combat conditions.

Conventional emergency oil supply systems have generally included emergency oil reservoirs strategically located throughout the engine so as to provide a limited supply of oil in the event of a failure within the main oil supply system. The emergency oil reservoirs are filled from the main oil supply system and generally include either a gravity feed drain or an air pressure means for supplying a stream of oil to the bearings. The supply of oil from the emergency reservoirs is generally closed off by a series of check valves during normal engine operation and in the event of a loss of oil pressure or supply, manual or automatic actuation of the check valves is required to open the supply of emergency oil.

The disadvantages of such an emergency supply system are that operation of the system depends upon actuation of check valves, the controls of which may also sustain damage. The inclusion of check valves with their control mechanisms unnecessarily complicates the engine design providing for a reduced degree of reliability together with an increased weight and cost penalty. Closing off the emergency oil reservoir during normal engine operation also provides for oil stagnation gradually leading to heat degradation of the oil. The gravity feed drain feature of most conventional emergency oil supply systems may not provide a sufficient stream of oil to adequately lubricate the contacting surfaces of lubricated parts and does not supply a cooling air flow to the lubricated parts.

Therefore, it is a primary object of this invention to provide a simplified emergency oil supply system for continuous automatic operation after failure of the main oil supply system without actuating individual check valves.

It is also an object of this invention to provide a simplified emergency oil supply system which operates continuously during normal engine operation and for a limited duration after failure of the main engine oil supply system thereby eliminating the possibility of emergency oil stagnation and degradation during normal engine operation.

It is a further object of this invention to provide a simplified emergency oil supply system wherein an adequate stream of emergency oil is provided by air pressure means which also provides an additional cooling flow to the lubricated part.

SUMMARY OF THE INVENTION

An emergency lubrication supply system provides lubricant to a lubricated part for a limited duration after failure of a main lubrication supply system. The emergency lubrication system includes an oil reservoir in substantial proximity to the lubricated part for receiving lubricant from the main supply system. A first conduit means has an inlet communicating for receipt of lubricant from the reservoir, and extends from the reservoir to an outlet for discharge of lubricant to the lubricated part. A second conduit means has an inlet communicating to a point substantially below the first conduit inlet for receipt of lubricant from the reservoir and extends from the reservoir to an outlet for discharge of lubricant to the lubricated part. Air flow means supplies a continuous flow of pressurized air over the second conduit outlet creating a suction therein for drawing lubricant through the second conduit during normal operation and during emergency operation when the main oil source has been disabled.

DESCRIPTION OF THE DRAWINGS

While the specification concludes with a series of claims which particularly point out and distinctly claim the subject matter which applicants regard as their invention, an understanding of this invention may be gained from the following detailed description of a preferred embodiment, which is given in light of the accompanying drawings, in which:

FIG. 2 is a partially cutaway perspective view of the emergency oil supply system of this invention.

DESCRIPTION OF THE PREFERRED EMBODIMENT

Figure 1:
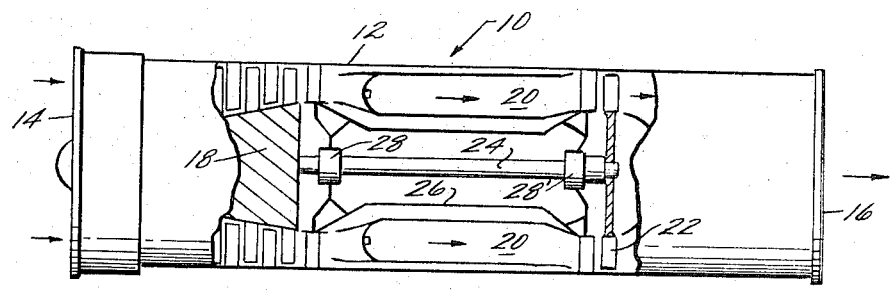
FIG. 1 is a partially cutaway side view of a gas turbine engine embodying the emergency oil supply system of this invention.

Referring first to FIG. 1, an aircraft gas turbine engine 10 of the turbojet type is illustrated wherein the engine includes a casing 12 of generally cylindrical form, having an inlet 14 and an exhaust nozzle 16 at opposite ends thereof. The gas turbine engine 10 also includes an axial flow compressor 18, a combustor 20, and a turbine 22 disposed in serial flow relationship between the inlet 14 and the exhaust nozzle 16. Connection between the turbine 22 and axial flow compressor 18 is provided by means of a shaft 24 which is rotatably disposed in relation to an engine frame 26. The shaft 24 is journalled in bearing assemblies shown generally at 28, 28', which include the emergency oil supply capability of this invention now to be described in complete detail. Although the emergency oil supply system of this invention is described in relation to an engine bearing, it is understood to have substantially broader application and may be applied to any engine part requiring lubrication.

Referring now to FIG. 2, there is shown a broken away portion of the shaft 24 journalled for rotation with respect to the stationary engine frame member 26. The rotatable shaft 24 includes an inside annular bearing ring 30 which circumscribes the shaft 24, and may be retained in fixed position relative to the shaft for rotation therewith by means of either brazing or a press fit to the shaft. Alternatively, the inside ring 30 could be secured to the shaft 24 by means of a bearing nut, not shown, in a manner well known to the art. A plurality of roller bearings 32 are circumferentially disposed about the inner bearing ring 30 and radially retained relative to the inner bearing ring by means of an outer annular bearing ring 34. The outer bearing ring 34 is radially spaced apart from the inner bearing ring 30, and is maintained in concentric relation to the inner bearing ring by the rollers 32. The rollers 32 are circumferentially spaced apart by means of a roller cage 36 in a manner well known to the art. The emergency oil supply system of this invention is by no means limited to the particular bearing herein described which is of conventional design. The system may be applied to other types of bearings, such as ball bearings, with equal success.

A bearing sump 40 is generally defined by an annular emergency oil reservoir 42 spaced radially outward of the rotating shaft 24 and concentric thereto, with the upstream and downstream axial limits of the sump 40 generally defined by labyrinth seals 44 and 46 respectively.

The emergency oil reservoir 42 is defined by an outer circumferential wall 48 spaced radially outward of, and generally concentric to, an inner circumferential wall 50. The axial limits of the oil reservoir 42 are defined by two generally planar, spaced apart, upstream and downstream end walls, 52 and 54, which are peripherally joined to the outer and inner circumferential walls 48, 50. Pressurized oil for lubricating the contacting surfaces between the rollers 32 and rings 30, 34 is supplied from an external main oil reservoir, not shown, by way of a conduit 58 which connects with an oil inlet port 56 to the emergency oil reservoir 42.

A main stream of lubricant is directed to the contacting surfaces between the rollers and rings by means of a standpipe 60 provided through the inner circumferential wall 50 of the emergency oil reservoir 42. The standpipe 60 may be brazed to the inner circumferential wall 50, and preferably terminates in a primary nozzle 62 in order to provide a jet of lubricant to the contacting surfaces of the bearing. The inlet 61 to the standpipe 60 is in close proximity to the top of the emergency oil reservoir 42 so as not to convey lubricant until the emergency oil reservoir 42 becomes substantially filled.

An emergency stream of lubricant is continuously provided to the contacting bearing surfaces by means of a capillary tube 64 connecting to a point substantially near the bottom of the emergency oil reservoir 42 through a small passageway 68. Flow communication from the emergency oil reservoir 42 to the small passageway 68 may be provided by means of an inlet port 70. Alternatively, the small passageway 68 may extend only half way around the emergency oil reservoir, terminating at a location near the bottom thereof. The inside end of the capillary tube 64 terminates in a secondary nozzle 66 in order to provide a continuous jet of lubricant to the contacting bearing surfaces. The capillary tube 64 is slightly circumferentially displaced from the standpipe 60 in order to provide two substantially parallel streams of lubricant. The location of the capillary tube 64 near the top of the emergency oil reservoir functions to prevent the reservoir from either draining or syphoning once it is filled.

The downstream labyrinth seal 46 is of a modified type having a rotor element 72 secured for rotation with the shaft 24 and an abradable stator element 74, concentric to the rotor element 72, which remains stationary with respect to the engine frame 26. The labyrinth seal rotor element 72 includes a plurality of axially spaced, circumferential teeth 76 which extend radially outward from the outer surface of the rotor element 72. The rotating teeth 76 cooperate with the stator element 74 to provide an effective fluidic seal in a manner well known to the art.

The upstream labyrinth seal 44 is conventional and includes an annular, rotor element 78 secured for rotation with the shaft 24, together with an annular abradable stator element concentric to the rotor element which may be formed integral to the outer bearing ring 34 so as to remain stationary with respect to the engine frame 26. A plurality of axially spaced circumferential teeth 82 cooperate with the stator element 80 in order to provide effective fluidic sealing therebetween in the manner previously described. Alternatively, other types of labyrinth or carbon seals could be utilized in place of the cylindrical labyrinth seal illustrated.

A seal air manifold 84 for the receipt and distribution of pressurized seal air is provided around the labyrinth seal 46 adjacent the downstream end of the emergency oil reservoir 42. The seal air manifold 84 is defined by an outer circumferential wall 86 spaced radially outward of the labyrinth seal stator 74 in cooperation with a downstream generally planar wall 88 which is peripherally joined to the seal stator 75 and the outer wall 86.

Compressed air, which may be bled from a point intermediate the axial limits of the compressor 18 of FIG. 1, is directed to the seal air manifold 84 by internal conventional ducting means (not shown). The pressurized seal air enters and fills the manifold 84 through an annular seal air inlet opening 90. The pressurized seal air then exits through a plurality of seal air outlet ports 92 circumferentially spaced apart through the labyrinth seal stator member 74. Pressurized seal air exiting through the outlet ports 92 divides into two generally cylindrical air sheets flowing in forward and aft directions, which operate to pressurize the labyrinth seal in a conventional manner confining lubricant to the area of the bearing sump 40. The cylindrical sheet of pressurized seal air emanating into the sump from the forward portion of the labyrinth seal 46 provides a dual function making possible the high degree of reliability attributable to the emergency oil supply system of this invention, as will become obvious from the following discussion.

During initial start of the engine, the emergency oil reservoir 42 first fills with lubricant supplied through oil conduit 58. The emergency stream of lubricant from the capillary tube 64 starts to flow almost immediately once the lubricant reaches the bottom of the reservoir 42. The cylindrical sheet of pressurized seal air entering the bearing sump 40 from the labyrinth seal 46 continuously passes over the secondary nozzle 66 of the capillary tube 64 to provide a suction within the tube 64 and passageway 68. This suction operates to continuously draw lubricant from the bottom of the reservoir 42. However, once the reservoir is filled, it will be appreciated that the overwhelming pressure of the incoming lubricant takes over as the primary means for driving lubricant through the capillary tube during normal engine operation.

As can readily be seen from FIG. 2, the secondary nozzle 66 is aligned closely adjacent the outside edge of one of the labyrinth seal teeth 76'. This arrangement operates to provide a constricted area adjacent the secondary nozzle wherein the cylindrical sheet of pressurized seal air incurs an increased velocity and a decreased pressure in the constricted area, much in the manner of a venturi. This "venturi action" operates to provide a more than adequate suction for drawing lubricant through the capillary tube 64.

The cylindrical sheet of pressurized seal air then commingles with the lubricant jetting from the nozzle 66 so as to atomize a portion of the lubricant and provide a continuous lubricant mist flow to the contacting bearing surfaces. Lubricant collecting at the bottom of the sump 40 is returned to the main oil reservoir through the scavenging tube 93. The emergency oil reservoir 42 must be substantially full before the lubricant enters the standpipe inlet 61 and flows in a parallel stream to the contacting bearing surfaces.

In the event of an emergency such as a rupture or puncture in the oil conduit 58, lubrication pressure and flow will rapidly decrease. As previously discussed, the possibility of a rupture or puncture in any component of the main oil supply system is of particular concern to military aircraft flying combat missions where the oil supply components, which are generally situated external to the engine casing, are more vulnerable to damage from enemy fire. Without lubrication the high speed rotor 24 will quickly seize to the engine frame 26, resulting in catastrophic engine failure. The emergency oil reservoir 42 is designed to provide a limited period during which an emergency stream of lubricant is provided to the contacting bearing surfaces after a loss of lubricant from the oil conduit 58 and to provide additional air flow cooling during the emergency period of slow metered oil flow.

When the supply of lubricant from the oil conduit 58 becomes disabled for whatever reason, the level of lubricant within the emergency oil reservoir 42 will immediately start to decrease. The main lubrication stream from the standpipe 60 will cease to flow within a very short period of time after the supply of lubricant becomes disabled. The stream of emergency lubrication mist from the capillary tube 64, however, continues to flow at a low metered rate so as to drain the emergency oil reservoir 42, providing lubrication and cooling air flow to the contacting bearing surfaces for a limited duration. The aircraft may therefore continue to safely operate for a limited time, generally sufficient to reach a safe landing zone after sustaining damage to the lubrication system. As previously discussed, such a requirement is of obvious critical importance particularly for a military aircraft when operating in a combat environment. When the level of lubricant decreases within the emergency oil reservoir 42, the inlet 61 to the standpipe 60 is uncovered allowing pressurized air from the bearing sump 40 to enter the standpipe and equalize the reservoir and sump pressures. The emergency lubrication mist automatically continues to flow and impinge on the contacting bearing surfaces at the slow metered rate until the reservoir 42 is emptied.

Extreme reliability is provided by the fact that the emergency lubrication mist flows continuously even during normal engine operation, and need not be actuated by an independent control mechanism during an emergency situation as has been the case for conventional systems. Also, whereas the pressurized seal air is routed internal to the compressor and combustor, there is substantially less risk of losing seal air even under combat conditions, when compared to the risk of losing oil through components and pipes which generally run external to the engine casing.

Figure 3:
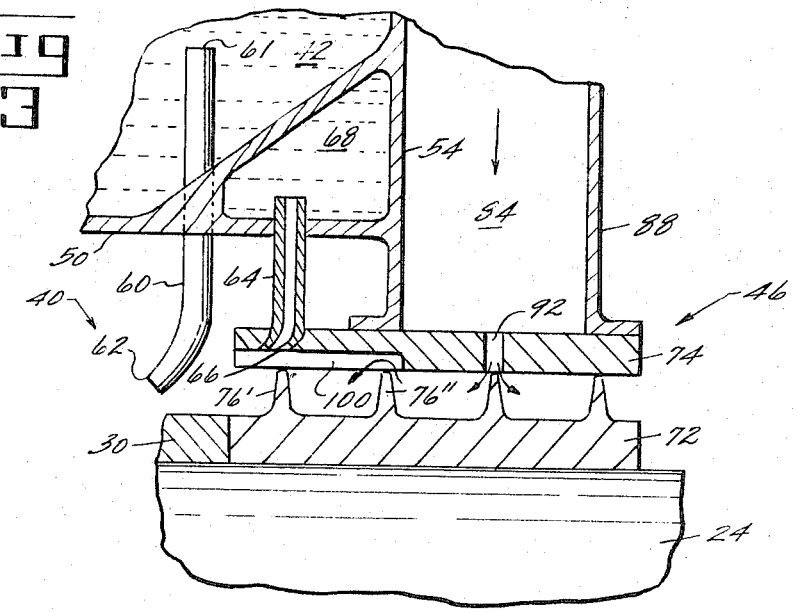
FIG. 3 is an enlarged partial cross-sectional view of an alternate embodiment for the emergency oil supply system of FIG. 2.

Referring now to FIG. 3 where like numerals refer to previously described elements, there is shown an arrangement whereby the pressure of the cylindrical sheet of seal air in the vicinity of the secondary nozzle may be increased. An axially extending groove 100 is provided in the surface of the seal stator 74 to reduce locally the pressure loss normally incurred by the seal air in flowing over the tooth 76''. As becomes obvious, the groove 100 allows a higher velocity of seal air to flow over the secondary nozzle 66 permitting an increased suction in the capillary tube 64. The groove 100 may be extended entirely back to outlet port 92 over a number of labyrinth teeth should such an increased velocity be warranted.

While preferred embodiments of the above described invention have been shown, it should be obvious that certain changes could be made in the described embodiments without departing from the broader aspects of the invention. For example, the emergency oil reservoir 42 need not extend entirely around the bearing and could even be displaced a short distance away from the bearing if required to accommodate particular hardware. Also, carbon seals could be substituted for the described labyrinth seals with pressurized air supplied from a separate conduit directly to the secondary nozzle. Alternatively, several bearings, gears, or other lubricated parts could be serviced from a single emergency reservoir. Therefore, in light of the above it is intended that the appended claims cover all such changes and modifications as fall within the broader concepts of the above disclosure.

Having thus described one embodiment of the invention, what is desired to be secured by letters patent is as follows:

1. An emergency lubrication supply system providing lubricant to a lubricated part for a limited duration after failure of a main lubrication supply system comprises:

an emergency oil reservoir in substantial proximity to the lubricated part for receiving lubricant from the main supply system;

a first conduit means having an inlet communicating for receipt of lubricant from the reservoir, and extending from the reservoir to an outlet for discharge of lubricant to the lubricated part a second conduit and passageway means having an inlet communicating to a point substantially below the first conduit inlet for receipt of lubricant from the reservoir and extending from the reservoir to an outlet for discharge of lubricant to the lubricated part, and air flow means for continuously supplying a flow of pressurized air over the second conduit outlet creating a suction therein for drawing lubricant through the second conduit during both normal operation and emergency operation when the main oil source has been disabled.

2. The emergency lubrication supply system of claim 1 wherein the lubricated part rotatably maintains a shaft with respect to a stationary frame member and there is further included a seal spaced axially apart from the lubricated part, wherein the seal comprises:

a rotor element secured for rotation with respect to the shaft and a stator element concentric to the rotor element and stationary with respect to the frame member wherein the air flow means pressurizes the space between the stator and rotor elements and flows over the second conduit outlet.

3. The emergency lubrication supply system of claim 2 wherein:

the seal is of the labyrinth type having a plurality of axially spaced circumferential teeth extending radially outward from the outer surface of the rotor element, and the stator element includes an opening therethrough for directing the flow of pressurized air between the rotor and stator elements;

and the second conduit outlet is aligned closely adjacent the outside edge of one of the labyrinth teeth to provide a constricted area adjacent the second conduit outlet such that the pressurized air incurs an increased velocity and a decreased pressure in the constricted area.

4. The emergency lubrication supply system of claim 3 wherein the seal stator element includes at least one generally axially aligned groove extending from the second conduit outlet over at least one labyrinth seal tooth to locally increase the velocity of seal air over the second conduit outlet.

5. In a gas turbine engine of the type having a compressor, combustor, and turbine in serial flow relation, an emergency lubrication supply system providing lubricant to a lubricated part for a limited duration after failure of a main lubrication supply system comprises:

at least one emergency oil reservoir in substantial proximity to the lubricated part for receiving lubricant from the main supply system;

a first conduit means having an inlet communicating for receipt of lubricant from the reservoir, and extending from the reservoir to an outlet for discharge of lubricant to the lubricated part;

a second conduit and passageway means having an inlet communicating at a point substantially below the first conduit inlet for receipt of lubricant from the reservoir and extending from the reservoir to an outlet for discharge of lubricant to the lubricated part, and air flow means for continuously supplying a flow of pressurized air over the second conduit outlet creating a suction therein for drawing lubricant through the second conduit during both normal operation and emergency operation when the main oil source has been disabled.

6. The emergency lubrication supply system of claim 5 wherein the lubricated part rotatably maintains a shaft with respect to an engine frame member, and there is further included a seal spaced axially apart from the part, wherein the seal comprises:

a rotor element secured for rotation with respect to the shaft, and a stator element concentric to the rotor element and stationary with respect to the frame member wherein the air flow means pressurizes the space between the stator and rotor elements and flows over the second conduit outlet.

7. The emergency lubrication supply system of claim 6 wherein:

the seal is of the labyrinth type having a plurality of axially spaced circumferential teeth extending radially outward from the outer surface of the rotor element and the stator element includes an opening therethrough for directing the flow of pressurized air between the rotor and stator elements, and the second conduit ouetlet is aligned closely adjacent the outside edge of one of the labyrinth teeth to provide a constricted area adjacent the second conduit outlet such that the pressurized air incurs an increased velocity and a decreased pressure in the constricted area.

8. The emergency lubrication supply system of claim 7 wherein the seal stator element includes at least one generally axially aligned groove extending from the second conduit outlet over at least one labyrinth to locally increase the velocity of seal air over the second conduit outlet.

9. The emergency lubrication system of claim 5 wherein:

the lubricated part rotatably maintains a shaft with respect to an engine frame member;

the emergency oil reservoir is generally shaped as a hollow annulus;

the lubricated part is situated within a sump generally defined by the annular emergency oil reservoir spaced radially outward of the rotating shaft and concentric thereto, with the upstream and downstream axial limits of the sump generally defined by upstream and downstream seals together with means for scavenging lubricant from the sump;

the inlet to the first conduit is in close proximity to the top of the emergency oil reservoir so as not to convey a mainstream of lubricant to the lubricated part until the emergency oil reservoir becomes substantially filled;

the second conduit is displaced a slight circumferential distance from the first conduit in order to provide an emergency stream of lubricant substantially parallel to the main stream, and the inlet to the second passageway communicates to a point substantially near the bottom of the emergency oil reservoir.

10. The emergency oil supply system of claim 9 wherein one of the seals comprises:

a rotor element secured for rotation with respect to the shaft, and a stator element concentric to the rotor element and stationary with respect to the frame member wherein the air flow means directs compressor bleed air between the stator and rotor elements before the compressor bleed air flows over the second conduit outlet.

11. The emergency oil supply system of claim 9 wherein one of the seals is of the labyrinth type comprising:

a rotor element secured for rotation with respect to the shaft and having a plurality of axially spaced circumferential teeth extending radially outward from the outer surface of the rotor element, and a stator element concentric to the rotor element and stationary with respect to the frame member wherein the air flow means includes an opening through the stator element for directing air bled from the compressor between the rotor and stator elements, and wherein the second conduit outlet is aligned closely adjacent the outside edge of one of the labyrinth teeth to provide a constricted area adjacent the second conduit outlet such that the pressurized air incurs an increased velocity and a decreased pressure in the constricted area.

12. The emergency oil supply system of claim 11 wherein the seal stator element includes at least one generally axially aligned groove extending from the second conduit outlet over at least one labyrinth tooth to locally increase the velocity of seal air over the second conduit outlet.

* * * * *

UNITED STATES PATENT OFFICE
CERTIFICATE OF CORRECTION

Patent No. 3,779,345          Dated  December 18, 1973

Inventor(s)  Thomas Carl Barnes et al.

It is certified that error appears in the above-identified patent and that said Letters Patent are hereby corrected as shown below:

On the cover sheet insert -- General Electric Company, a corporation of New York --.

Signed and sealed this 17th day of September 1974.

(SEAL)
Attest:

McCOY M. GIBSON JR.          C. MARSHALL DANN
Attesting Officer            Commissioner of Patents